United States Patent

Taschenberg

[15] 3,640,541
[45] Feb. 8, 1972

[54] HYDRODYNAMIC LIFT-TYPE FACE SEAL

[72] Inventor: Ernest J. Taschenberg, Baltimore, Md.
[73] Assignee: Koppers Company, Inc.
[22] Filed: June 12, 1970
[21] Appl. No.: 45,632

[52] U.S. Cl. ................................................. 277/96
[51] Int. Cl. ........................... F16j 15/34, F16j 15/54
[58] Field of Search ........................... 277/96, 27, 3, 75

[56] References Cited

UNITED STATES PATENTS

| | | | |
|---|---|---|---|
| 1,876,515 | 9/1932 | Emmet | 277/70 |
| 1,876,520 | 9/1932 | Newkirk et al. | 277/88 X |

FOREIGN PATENTS OR APPLICATIONS

| | | | |
|---|---|---|---|
| 920,892 | 3/1963 | Great Britain | 277/96 |

*Primary Examiner*—Samuel B. Rothberg
*Attorney*—Boyce C. Dent, Oscar B. Brumback and Olin E. Williams

[57] ABSTRACT

An annular shoulder arranged to be secured to a rotating shaft has a radially extending planar seal face or surface. An annular housing member nonrotatably supports an annular seal ring and is arranged to have the rotatable shaft extend therethrough. The seal ring has a planar radially extending seal face or surface that is positioned in face-to-face relation with the rotatable seal surface on the annular shoulder. The shoulder seal surface has a plurality of separate recessed pockets arranged in spaced relation to each other. The pockets have an L-shaped configuration with an angularly extending leg. The pockets have a relatively deep recessed portion and a shallow recessed portion connected thereto and extending angularly therefrom with a step therebetween. The step is chamfered to improve the fluid lift properties of the pockets. The seal surface on the seal ring has an annular fluid distributor groove positioned in overlying relation with a portion of the radially extending portion of the recessed pockets to receive and distribute the fluid. The seal ring seal surface has a second annular vent groove-spaced radially outwardly from the distributor groove forming a seal dam therebetween. Radial vent passages are formed in the seal ring and are connected to the vent groove. The sealing function of the seal faces is performed radially outwardly from the outer shoulder of the distributor groove and the lifting function is performed radially inwardly of the outer shoulder of the distributor groove.

6 Claims, 5 Drawing Figures

PATENTED FEB 8 1972　　　　　　　　　　　　　　　3,640,541

INVENTOR.
Ernest J. Taschenberg
BY Boyce C. West
HIS ATTORNEY.

HYDRODYNAMIC LIFT-TYPE FACE SEAL

BACKGROUND OF THE INVENTION

1. Field of the Invention

This invention relates to face seals and more particularly to hydrodynamic lift-type face seals.

2. Description of the Prior Art

Certain hydrodynamic lift-type face seals, as for example, the seals disclosed in U.S. Pat. Nos. 845,701; 1,876,515; 1,876,520; 2,127,151 and 3,408,085 include an annular groove with radial recesses extending therefrom to provide a hydrodynamic lifting force for one of the seal faces. Some of these patents also disclose tapered lands for the radial recesses that are intended to improve the hydrodynamic lift. The sealing functions and the hydrodynamic lift or bearing functions between the two seal faces or surfaces are usually dependent on each other and limit design versatility. There is a need for a hydrodynamic lift-type face seal that has improved hydrodynamic lift pockets and a seal face where the sealing and lifting functions are separate and independent of each other.

SUMMARY OF THE INVENTION

In accordance with the present invention, the hydrodynamic lift-type seal includes an annular shoulder member that is adapted to be secured to a rotatable shaft for rotation therewith. The annular shoulder has a radially extending annular planar sealing surface. An annular housing member nonrotatably supports a seal ring assembly and the annular housing member with the seal ring assembly is arranged to have the rotatable shaft extend therethrough. A seal ring in the seal ring assembly has an annular planar sealing surface. Springs are provided to urge the planar sealing surface on the seal ring into abutting sealing relation with the sealing surface on the annular shoulder member. One of the sealing surfaces has a plurality of separate recessed pockets formed therein. The pockets are arranged in spaced relation to each other. Certain of said pockets have a first relatively deep recessed portion with a second relatively shallow recessed portion extending therefrom with a step between the recessed portions. The step has a radially extending chamfered edge portion that improves the lift properties of the fluid between the sealing surfaces. The other sealing surface includes a first annular fluid distribution groove that is positioned in overlying relation with portions of the pockets for flow of fluid from the pockets into the annular distribution groove. A second vent groove is provided in the other sealing surface in radially spaced relation thereto to provide an annular seal dam therebetween. The sealing function is performed radially outwardly from the outer shoulder of the distributor groove and the lift function is performed radially inwardly from the outer shoulder of the distributor groove.

The recessed portions of the pockets in the sealing surface are preferably made so that the shallow portion has a depth of between 0.0003 of an inch and 0.0005 of an inch. It is also desirable that the pockets be formed in the hard, relatively wear-resistant seal surface rather than in the other relatively soft seal surface. The recessed pockets formed in the wear-resistant surface retain their geometry for substantial periods of time and retain the desired depth of the shallow portion to provide improved lift properties for substantial periods of time.

With the above arrangement, it is also possible to have a continuous, uninterrupted surface adjacent to the recessed pockets and thus, extend the range of operation of the seal by increasing the load carrying ability of the seal face.

A feature of the herein described invention is to increase the lift of a hydrodynamic lift-type face seal to thereby increase the load carrying capacity of the seal face.

Another feature of this invention is to separate the sealing function and the lifting function of the annular seal faces to thereby achieve control in design.

DESCRIPTION OF THE PREFERRED EMBODIMENT

Figure 1:
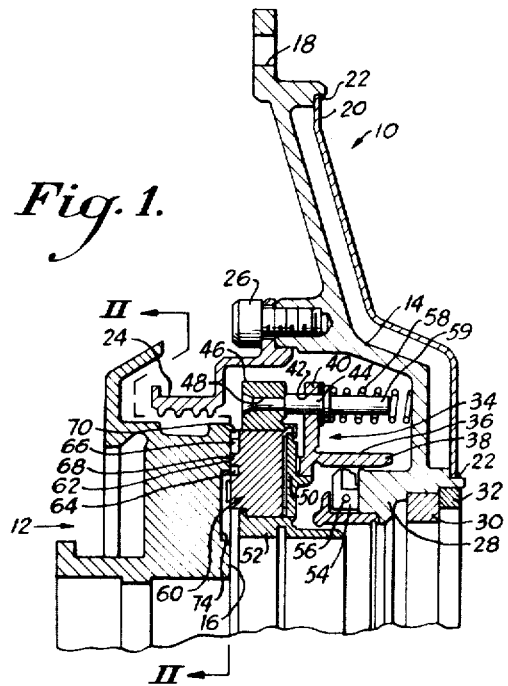
FIG. 1 is a fragmentary view in elevation and section of one embodiment of a hydrodynamic lift-type face seal assembly with the improved seal surfaces.

Referring to the drawings, and particularly FIGS. 1-4, there is illustrated a face seal assembly generally designated by the numeral 10 that includes an annular shoulder member generally designated by the numeral 12 and a housing member 14. The annular shoulder member 12 is metallic and preferably plated with a wear-resistant material, such as tungsten carbide. The annular shoulder portion 12 is arranged to be secured to a rotatable shaft for rotation therewith and has an annular seal face or surface 16. Throughout the specification, the words face and surface will be used interchangeably to designate a seal surface against which another seal surface is positioned and form a seal therebetween.

The housing 14 is also of annular configuration and has a central passageway through which the rotatable shaft is arranged to extend. The housing 14 has bolt holes 18 for rigidly securing the housing to a nonrotatable surface. A heat shield 20 is suitably secured to the housing by welds 22 or the like. An annular windback 24 with right-handed threads is secured to the housing 14 by capscrews 26. The housing 14 has an inturned annular shoulder portion 28 with a labyrinth 30 secured to the inner wall by an annular retainer ring 32.

A face seal ring assembly, generally designated by the numeral 34, is positioned within the confines of the housing 14 and includes an annular seal ring retainer adapter 36 that has a cylindrical portion 38 and a radially extending annular portion 40. A plurality of spaced apertures 42 extend through the radially extending portion 40 and pin members 44 extend through the apertures 42.

An annular seal ring retainer 46 has a plurality of axial apertures 48 through which the pin members 44 extend. With this arrangement, the pin member 44 secures the retainer ring 18 to the face seal ring retainer adapter 36. An annular seal ring adapter 50 is suitably engaged to the seal ring retainer 46 and the seal ring retainer adapter 36 and is maintained in position by an annular seal ring insert 52. A piston ring 54, that is maintained in abutting relation with the inner surface of the cylindrical portion 38 of the seal ring retainer adapter 36 by a piston ring retainer 56. The piston ring retainer maintains the piston ring in a fixed relative position within the annular housing 14.

A coil spring 58 is positioned around a coil spring guide 59 extending axially parallel to the pins 44 and abuts at one end, the radially extending portion 40 of seal ring retainer adapter 36 and at the other end, a portion of the housing 14 to thus urge the seal ring retainer adapter 36 toward the shoulder 12. An annular seal ring 60, is positioned between the seal ring insert 52 and the annular seal ring retainer 46 and maintained in position therebetween. The seal ring 60 is preferably fabricated from a carbonaceous material that is moderately wear resistant. The seal ring 60 has a planar radially extending seal face or surface 62 that is urged into abutting relation with seal surface 16 of the shoulder member 12. The seal face 62 has an annular distribution groove 64 and an annular vent groove 66 with a annular seal dam portion 68 therebetween. There are also provided radial vents passages 70 connected to the vent groove 66 for flow of fluid therefrom.

Figure 3:
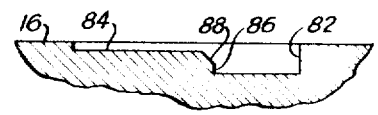
FIG. 3 is a fragmentary view in section, taken along the line III—III through one of the recessed pockets in the seal face of the shoulder member illustrating the relatively deep recessed portion, the relatively shallow recessed portion and the chamfered step therebetween.
Figure 4:
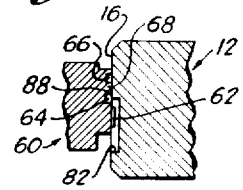
FIG. 4 is an enlarged view in side elevation and section of the seal elements illustrating the separation of the sealing function and the lifting function.
Figure 2:
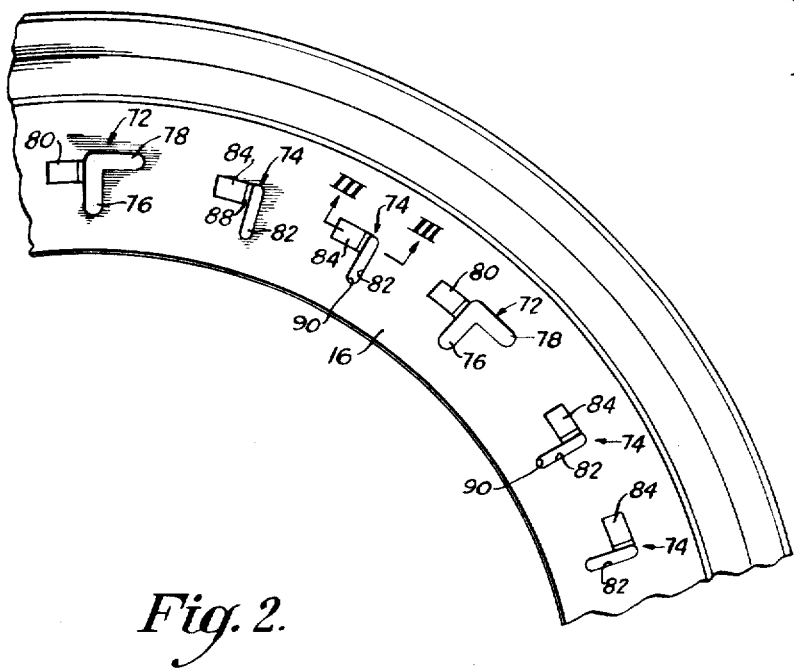
FIG. 2 is a fragmentary view in elevation, taken along the line II—II in FIG. 1, illustrating the seal face of the annular shoulder with recessed pockets that provide the improved lift properties to the seal assembly.

Referring to FIGS. 2, 3 and 4, the seal face 16 of the shoulder 12 has a plurality of T-shaped pockets 72 extending around the seal face or surface 16 at substantially the same radial distance from the axis of shoulder 12 and in spaced relation to each other. Between certain of the T-shaped pockets 72, there are radially extending L-shaped pockets 74 positioned on substantially the same circumference as the T-shaped pockets 72. The T-shaped pockets 72 have a radially extending leg portion 76, a first arm portion 78 and a second arm portion 80. The L-shaped pockets 74 have a radially extending leg portion 82 and a laterally extending arm portion 84. The leg 76 and arm 78 in pockets 72, have a relatively deep recess and the leg 82 of pockets 74 also have a relatively deep recess. The arms 80 and 84 of pockets 72 and 74 respectively have a relatively shallow recess. At the intersection of recessed portions 76 and 80 and 82 and 84, respectively, a step or shoulder 86 is formed. The relatively shallow recessed portions 80 and 84 have a generally rectangular configuration in plan and have a depth preferably between about 0.0005 and 0.0003 inches. The step 86 has a radially extending chamfered surface portion 88 as clearly illustrated in FIG. 3. The relatively shallow recessed portions intersect the relatively deep recessed portions 76 and 82 in the pocket members 72 and 74 and form the chamfered step 86 therebetween.

The shoulder member 12 is positioned in overlying relation with the seal ring 60 so that the sealing surfaces or faces 16 and 62 are in overlying relation as illustrated in FIG. 4. The radially extending legs 76 and 82 of the pockets 72 and 74 have a portion extending below the seal surface of seal ring 60 to permit the flow of fluid into the respective pockets 72 and 74. The annular distribution groove 64 in seal 60 overlies a portion of the radially extending legs 76 and 82 of pockets 72 and 74 to permit the flow of fluid through the pockets 72 and 74 into the distribution groove 64.

The lifting function of the hydrodynamic face seal is performed between the radially outer shoulder 88 of the distribution groove 64 inwardly to the radially inner edge 90 of the pockets 72 and 74. Between the outer shoulder 88 of distribution groove 64 and the vent groove 66, an annular portion 68 is formed that provides a seal dam for the fluid within the distribution groove 64. The sealing function of the face seal is performed between the outer annular shoulder 88 of the distribution groove 60 and the radially outer end of the seal 60. The fluid that flows over the seal dam 68 is collected in the annular groove 66 and flows outwardly through the radial vent passages 70. The sealing area and listing area of the seal faces in elevation are illustrated in FIG. 4.

Figure 5:
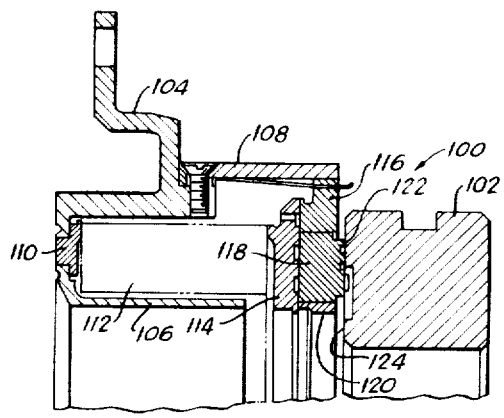
FIG. 5 is a fragmentary view in elevation and in section of a bellows-type hydrodynamic lift-type face seal including the improved seal surfaces.

Referring to FIG. 5, there is illustrated another embodiment of a hydrodynamic lift-type face seal. The face seal generally designated by the numeral 100 has a shoulder member 102 and a housing member 104. The housing member has an annular shield 106 secured thereto and a radially extending damping ring 108 also secured thereto by the screws. A bellows assembly 112 is maintained in position by means of a bellows adapter 110 and extends forwardly into abutting relation with an annular seal ring adapter 114. A seal ring retainer 116 depends downwardly from the damping ring 108 and a seal ring 118 is positioned between the seal ring adapter 114 and a stabilizer ring 120. The seal ring 118 has an annular seal face 112 with a configuration similar to the seal face 62 of seal ring 60 illustrated in FIG. 1. The shoulder 102 has a seal face 124 that has a similar configuration to the seal face 16 of the annular shoulder 12. With this arrangement, the bellows 112 urges the seal face 122 of seal ring 118 into abutting sealing relation with the seal face 124 of the shoulder 102. Pockets similar to pockets 72 and 74 are provided in the surface of seal face 124 of shoulder 102 and annular distribution and vent grooves are provided in the surface of seal face 122. With this arrangement, the fluid flows upwardly through the pockets into the distribution grooves and provides a lift force between the seal surfaces as previously described, and the sealing function of the respective seal faces 122 and 124 is performed radially beyond the distribution groove. In FIG. 5, the shoulder 102 is preferably fabricated from or plated with a relatively wear-resistant material, such as tungsten carbide, and the seal ring 118 is preferably fabricated from a carbonaceous material that is relatively soft and not as wear resistant as the seal face 124.

The above-described hydrodynamic lift-type face seals include improved hydrodynamic lift pockets 72 and 74 where there is a stepped relation between the relatively deep recessed portions 76, 78 and the relatively shallow recessed portion 80 in lift pocket 72 and between the relatively deep recessed portion 82 and the relatively shallow recessed portion 84 of lift pocket 74. The steps between the relatively deep and relatively shallow recessed portions have a chamfer 82 that increases the flow of fluid into the respective pockets which in turn, increases the lift effectiveness by factors in excess of 1.5.

Also, as previously discussed, the pockets are formed in the relatively hard seal surface that is not readily subject to wear and is highly wear resistant. This minimizes the change in the pocket depth, especially of the relatively shallow portion 78 so that the lift effectiveness of the hydrodynamic lift pockets is maintained and change of the depth dimension due to wear is minimized. Test data has illustrated that a standard seal face without hydrodynamic lift pockets provides a lift or bearing spacing of approximately 150 millionths of an inch. Hydrodynamic lift pockets, without the chamfered surface, increased the lift to approximately 200 to 250 millionths of an inch. When the edge portion between the lift pockets was chamfered as illustrated in FIG. 3, the increase in lift and thus, the load carrying capacity is increased by a factor of 2.5 to 3 times that of a standard gas face.

The above-described face-lift seal also separates the lifting function of the seal from the sealing function. As clearly illustrated in FIG. 3, the lifting function takes place radially inwardly of the outer circumference or shoulder 80 of distribution groove 64 in the seal 60. Similarly, the sealing function takes place radially outwardly beyond this shoulder 80 on the annular distribution groove 64. As independent features control of design can be achieved. This is so particularly because the flow variations across the sealing member of the seal face have little or no influence on the effectiveness of the hydrodynamic lift pockets used.

According to the provisions of the patent statutes, the principle, preferred construction and mode of operation of this invention have been explained and what is now considered to represent its best embodiment has been illustrated and described. However, it should be understood that, within the scope of the patent statutes, the invention may be practiced otherwise than as specifically illustrated and described.

I claim:
1. A hydrodynamic lift-type face seal comprising:
an annular shoulder member adapted to be secured to a rotatable shaft for rotation therewith, said annular shoulder having a radially extending annular planar sealing surface,
an annular housing member adapted to have said rotatable shaft extend therethrough,
a seal ring assembly positioned within said housing in nonrotatable relation thereto,
an annular seal ring mounted in said seal ring assembly and having radially extending annular planar sealing surface,
means to urge said last named planar sealing surface into abutting sealing relation with said first named planar sealing surface,
one of said sealing surfaces having a plurality of separate recessed pockets formed therein, said pockets arranged in spaced relation to each other and along substantially the same circular path, certain of said recessed pockets having a first relatively deep recessed portion and a second relatively shallow recessed portion contiguous with said first relatively deep recessed portion and forming a step therebetween, said step having a radially extending chamfered edge portion, said recessed pockets arranged to permit the flow of fluid therefrom between said sealing surfaces to thereby urge said sealing surfaces away from each other;

a first annular fluid distribution groove in said other sealing surface, said other sealing surface positioned in overlying relation with portions of said pockets for flow of fluid into said annular distribution groove; and a second annular vent groove in said other sealing surface spaced radially outwardly from said first annular fluid distribution groove forming a planar annular surface therebetween, said planar annular surface forming a seal dam for the fluid introduced into said distribution groove and providing a seal between said planar sealing surfaces.

2. A hydrodynamic lift-type face seal as set forth in claim 1 in which, one of said annular planar sealing surfaces is formed of a relatively soft material, said other annular planar sealing surface is formed of a relatively hard wear-resistant material, said plurality of recessed pockets being formed in said annular planar sealing surface of relatively hard wear-resistant material, said annular planar sealing surface formed of a relatively soft material including said first annular distribution groove and said second annular vent groove spaced radially outwardly from said first annular distribution groove.

3. A hydrodynamic lift-type face seal as set forth in claim 1 in which, certain of said recessed pockets have a relatively deep recessed portion with an L-shaped configuration, one of the legs of said L-shaped relatively recessed portion extending radially on said planar sealing surface, said radially extending recessed portion providing a flow passage for fluid to said first annular fluid distribution groove in said other sealing surface.

4. A hydrodynamic lift-type face seal as set forth in claim 1 in which, certain of said recessed pockets have a generally L-shaped configuration with a relatively deep recessed radially extending leg portion and a relatively shallow other leg portion extending angularly therefrom.

5. A hydrodynamic lift-type face seal as set forth in claim 1 in which said distribution groove in said other sealing surface has an outer circular shoulder portion, said sealing function of said sealing surfaces extending radially outwardly from said circular shoulder portion of said distribution groove, and the lifting function of said fluid introduced into said pockets extending radially inwardly from said circular shoulder portion of said distribution groove.

6. A hydrodynamic lift-type face seal as set forth in claim 1 which includes radial vent passageways extending from said annular vent groove.

* * * * *